J. P. Sleeper
Reed Organ

No. 7,747.        Patented Oct. 29, 1850.

UNITED STATES PATENT OFFICE.

JAS. P. SLEEPER, OF WORCESTER, MASSACHUSETTS.

REED MUSICAL INSTRUMENT.

Specification of Letters Patent No. 7,747, dated October 29, 1850.

*To all whom it may concern:*

Be it known that I, JAMES P. SLEEPER, of Worcester, in the county of Worcester and State of Massachusetts, have invented certain new and useful Improvements in Keyed Reed Musical Instruments; and I do hereby declare that the same are fully described and represented in the following specification and accompanying drawings, letters, figures, and references thereof.

Figure 3:
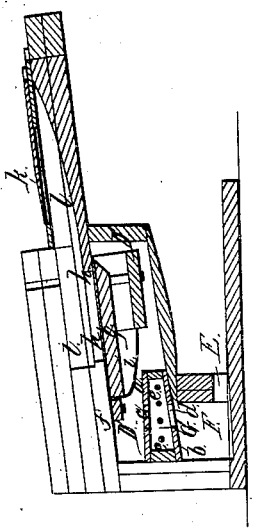
Figure 2:
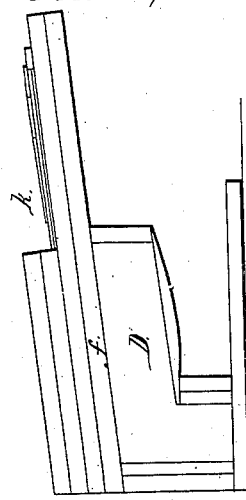
Figure 4:
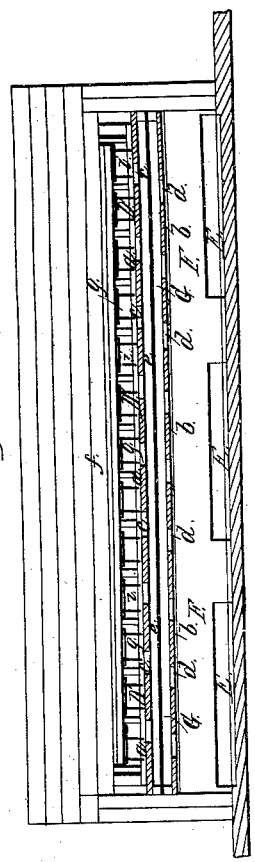
Figure 1:
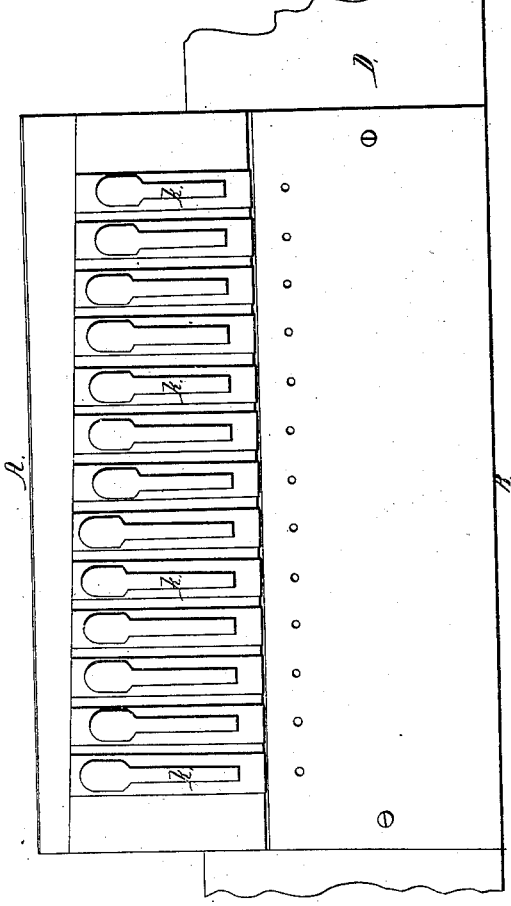

Of the said drawings, Figure 1, denotes a top view of a portion of a melodeon or reed musical instrument, having my improvements. Fig. 2, is an end elevation of it. Fig. 3, is a transverse section of it, taken on a line from A, to B, in Fig. 1. Fig. 4, is a longitudinal section of it, taken on a line from C, to D, of Fig. 1.

In Figs. 3 and 4, of the said drawings, D′, denotes the wind chest, which receives its wind through a passage F, which has one or more suitable openings E, arranged through its lower part or side, and made to communicate with the bellows in any proper manner. The passage F, is separated from the wind chest, by means of an elongated box G, of which $a$, is the top, and $b$, the bottom, the said top, as well as the said bottom, having a series of holes $c, c, c,$ or $d, d, d,$ made through it as seen in Figs. 3 and 4. Within this box, and between its top and bottom, and extending across it in a longitudinal direction, one or more strings or wires $e, e,$ are stretched, and suitably sustained at their ends so as to be capable of being vibrated by the wind, in its passage into and through the box, and out of the same, that is to say in its passage from the bellows to the wind chest. I have found that the addition of a series of strings to a wind chest essentially as above described, greatly improves the tone of the instrument, this being effected in consequence of a sympathetic action of the strings and reeds.

The valves of the reeds are placed within the wind chest, the openings of the said valves being made through the board $f$, which constitutes the top of the wind chest. In Fig. 3, one of the valves is seen at $g$, and the opening at $h$. The spring which presses the valve against its seat is seen at $i$. The reed of the said valve is represented at $k$, and it will be perceived on inspection of the drawings, that it is not placed directly over the valve opening $h$, but is arranged at a distance therefrom, and toward one end of a long passage $l$, through whose bottom, and at or near whose other end, the valve opening $h$, is made. Each reed has its passage $l$, so constructed, as to lead the air to it in a horizontal direction, and after it has passed through the valve opening.

It has been customary to place the reed directly over its valve opening, instead of arranging it aside or at a distance therefrom, and not directly over it. My improvement which consists in arranging the reed at a distance from the valve opening, and not directly over it, and providing the said reed and its opening, with an elongated passage $l$, made so as to conduct the wind in a horizontal or nearly horizontal direction, before it impinges against the reed, creates a deflection of the currents of air passing through the valve opening, and causes them to commingle in such manner as to strike with more uniformity on the reed than they do when it is placed directly over the valve opening. The vibration and tone of the said air, are therefore more uniform than they are when the reed is placed directly over the said valve opening.

What I claim as my invention is—

1. The improvement of the vibration string or strings, wire or wires, $e, e, e, e,$ in their combination with the wind chest, the same being made to be vibrated by the air in its passage into or through the wind chest substantially as specified.

2. I also claim the above described extension or elongation of the passage $l$, in combination with the improved arrangement of the reed and valve opening; the said arrangement consisting in placing the reed not directly over the valve opening, but at a distance therefrom, and in said passage substantially as specified.

In testimony whereof I have hereto set my signature, this fourth day of June A. D. 1850.

JAMES P. SLEEPER.

Witnesses:
HENRY CHAPIN,
GEORGE L. TAFT.